Dec. 21, 1954 C. T. WALTER 2,697,595
LEAF SPRING WEIGHING SCALE
Filed Aug. 27, 1946
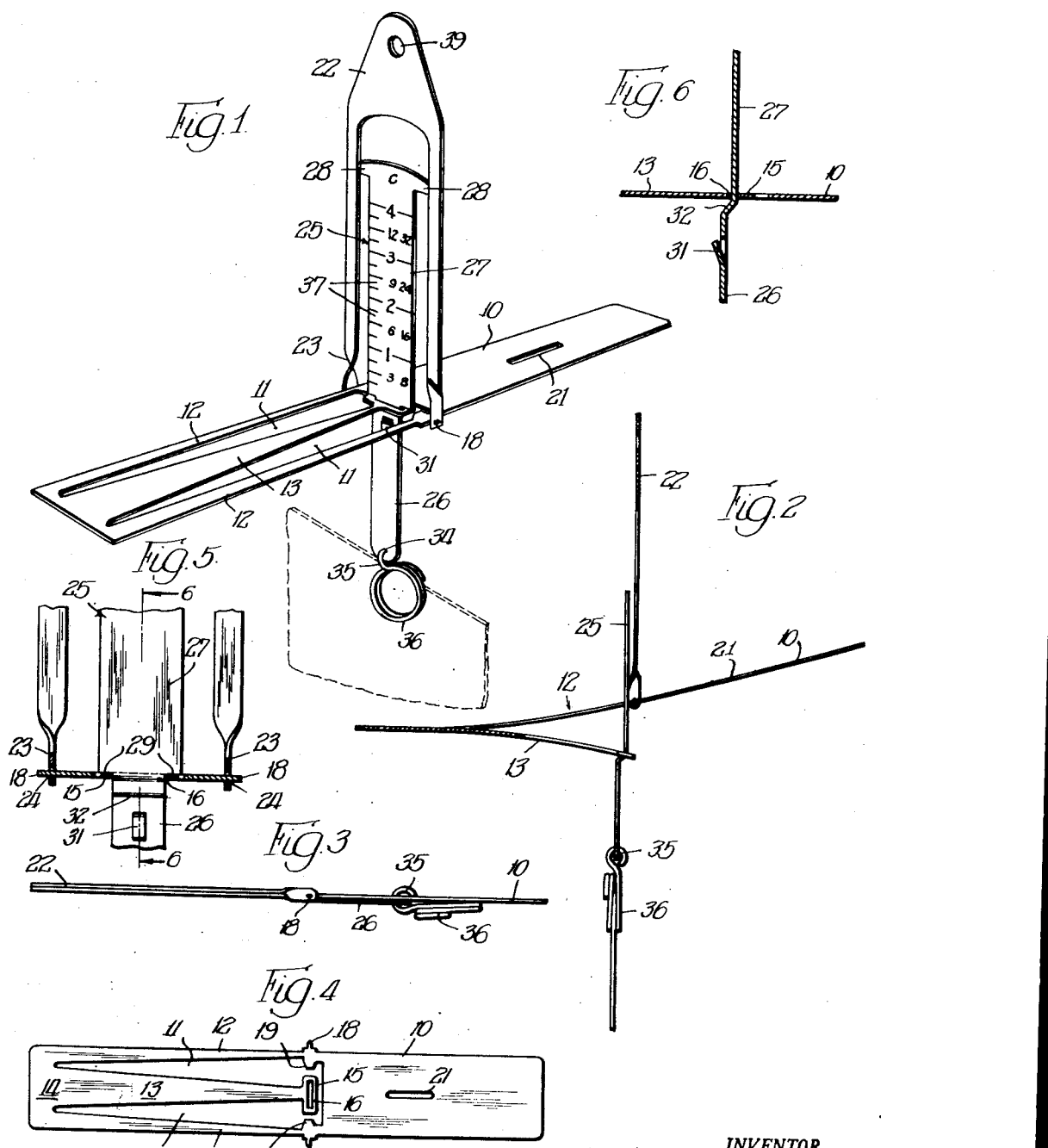
INVENTOR.
Charles T. Walter,
BY Brown, Jackson,
Boettcher & Dienner
Attys.

United States Patent Office 2,697,595
Patented Dec. 21, 1954

2,697,595

LEAF SPRING WEIGHING SCALE

Charles T. Walter, Peoria, Ill.

Application August 27, 1946, Serial No. 693,327

6 Claims. (Cl. 265—63)

The present invention relates to an improved weighing scale.

One of the principal objects of the invention is to provide a weighing scale characterized by a weighing spring of improved double cantilever leaf construction. This improved double cantilever leaf spring is punched out of a single piece of sheet metal, and results in a weighing spring of large deflection range, increased accuracy, and very low cost of construction.

Another feature of the double cantilever leaf spring is that it enables the fixed point of support at one end of the spring and the movable point of flexure at the other end of the spring to be disposed in substantially the same vertical plane. That is to say, by virtue of the doubled-back construction of the leaf spring the point where the downward weighing force is imposed on one end of the spring can be arranged substantially in the same vertical plane with or directly below the point where the other end of the spring has fixed support. This enables a relatively long length of spring to be used in a relatively small space. It also eliminates lateral tilting forces on the point of support.

Another object of the invention is to provide an improved postal scale utilizing such double cantilever leaf spring. This postal scale is of a small, portable folding type adapted for office use, home use or pocket use. The scale occupies little space on a desk or in a drawer, and can even be folded up for carrying in a vest pocket.

Other objects, features and advantages of the invention will appear from the following detailed description of one preferred embodiment thereof.

In the accompanying drawing illustrating such embodiment:

Figure 1 is a perspective view of the complete device;

Figure 2 is a side elevational view showing the two sections of the double cantilever leaf spring flexing downwardly in series under the weight of the article being weighed;

Figure 3 is a side or edge elevational view of the device folded as for carrying in the pocket;

Figure 4 is a plan view of the leaf spring stamping alone, before assembly in the scale;

Figure 5 is a fragmentary sectional view showing the pivotal connection between the inner section of the leaf spring and the pendant member; and Figure 6 is a detail sectional view taken on the plane of line 6—6 in Figure 5.

The device comprises a leaf spring stamping 10 which is adapted to be punched out of flat sheet metal stock in a single punching operation. This spring is preferably composed of an aluminum alloy typically represented by 24 ST, because such is non-corrosive, and also has a lower modulus of elasticity than steel, which is desirable in these small scales adapted to measure small weights. However, it will be understood that the leaf spring may be composed of other alloys or other metals, if desired. Figure 4 illustrates the complete stamping before assembly with the other elements of the device. It will be seen from this figure that the stamping has slotted or punched out areas 11 which define outer side legs 12 and an inner central leg 13. The left hand ends of the outer legs 12 and inner leg 13 are integrally joined together at 14, while the right hand end of the inner leg 13 is free to flex downwardly. Thus, the outer side legs 12 function together to form an outer or main leaf spring section and the inner central leg 13 functions as an inner or secondary leaf spring section, these two sections being adapted to flex downwardly in series so that the total flexure of the entire leaf spring is the cumulative flexures of the two sections. This is clearly shown in Figure 2, from which it will be seen that the two sections can flex apart into separate planes. The sectional width of the single inner leg 13 at different points along its length preferably equals the combined width of the two outer legs 12 at the corresponding points along their lengths so that both leaf spring sections flex downwardly to substantially the same degree in this cumulative flexure of the sections. The inner end of the central section 13 is formed with a T-shaped head or cross bar 15 having a transverse slot 16 therein. This slot is for receiving the pendant member from which the letter or package is adapted to be hung, as will be later described. Pivot lugs 18 project outwardly from the side edges of the stamping substantially in transverse alignment with the slot 16. These pivot lugs pivotally receive the side arms of the U-shaped holder or bail from which the device is suspended when in use. Indexing lugs 19 project inwardly into the slotted areas 11 substantially in transverse alignment with the slot 16 and pivot lugs 18. These indexing lugs 19 are adapted to function as pointers for registering with the different scale divisions marked on the pendant member. A longitudinal slot 21 is punched out in the other end portion of the leaf spring stamping for receiving part of the letter holding clip when the device is folded together into the position shown in Figure 3. This other end portion of the stamping, consisting of the entire right hand end portion of the plate 10, lying to the right of the pivot lugs 18, constitutes a counter-balance for counter-balancing the slotted left hand portion of the stamping plate 10.

Referring now to the holder or bail from which the scale is adapted to be suspended, this is preferably a U-shaped stamping 22 having substantially parallel side legs twisted at their lower ends as indicated at 23, and provided with pivot apertures 24 in the twisted ends for engaging over the pivot lugs 18 of the stamping 10.

Referring now to the pendant member, this is also preferably in the form of a sheet metal stamping 25 and comprises a relatively narrow lower portion 26, a wider upper portion 27, and still wider stop shoulders 28 at the top end of the stamping. In the assembly of the device, the narrow lower portion 26 passes down freely through the slot 16 in the free end of the inner leaf spring section 13, the shoulders 29 at the juncture of the lower portion 26 and upper portion 27 resting on top of the T-shaped cross bar 15. An upwardly and outwardly sloping tongue 31 is punched laterally from the lower pendant portion 26, and when this portion 26 is passed down through the slot 16 the tongue 31 can pass through the slot in a downward direction but thereupon snaps outwardly from the plane of the metal so that it prevents the pendant portion 26 from being displaced in an upward direction through the slot. As shown in Figure 6, this pendant stamping has an offset 32 formed therein just below the shoulders 29, whereby the lower portion 26 and upper portion 27 are disposed in separate planes offset by a distance slightly more than the thickness of the metal. This offset relation enables the pendant member to be folded more compactly with respect to the leaf spring member when the parts are folded together into the relation shown in Figure 3. The lower end of the pendant member is apertured at 34 to receive the upper loop 35 of a coiled spring wire paper clip 36. When the scale is to be used to measure the weight of a letter, the upper edge of the envelope is inserted between the convolutions of the clip 36. When the device is to be used to measure the weight of a small package or envelope tied by string, the string can be hooked under the free end of the paper clip wire 36.

Scale divisions 37 are marked on the front side of the pendant portion 27 for indicating the postage to be applied to the article being weighed. Preferably, these scale divisions are divided into two vertical columns, the scale markings along one edge of the portion 27 indicating the weight and postage required for first class mail, and the markings along the other edge indicating the weight and postage required for air mail. These two vertical scales or columns of markings are adapted to cooperate with the pointer lugs 19 projecting inwardly from the slotted areas of the spring stamping, these pointer lugs indicating the scale markings to be read on each of the respective vertical columns of markings. The upper stop shoulders 28 at the top of the pendant member are adapted to strike the pointer lugs 19 or the inner edges of the side legs 12 if too great a weight is suspended on the pendant member, thereby preventing the scale from being broken or abnormally flexed by an excessive weight.

It will be understood that in the use of the device the upper end of the holder 22 is held between the fingers, as shown in Figure 2, or the aperture 39 in this holder is held by a hook, cord or other supporting means. The letter or package is then secured to the spring wire clip 36 so that its weight is imposed on the free end of the inner leaf spring leg 13. This causes the two leaf spring sections 12—12 and 13 to flex downwardly in series in the manner shown in Figure 2, the degree of flexure being indicated by the scale markings 37 which come into registration with the pointer lugs 19. Such indicates the weight of the article and the required postage.

When the scale is to be folded into its nested position, shown in Figure 3, for placing in a drawer or carrying in a vest pocket, the pendant member 25 is swung into a position substantially parallel with the leaf spring stamping, the upper portion 27 of the pendant member being swung to overlie the central leaf spring 13, and the loop 35 of the spring clip 36 then passing up into the slot 21 in the other end of the stamping 10. The swinging bail or holder 22 can then be swung down to either side overlying either end of the stamping 10; the holder preferably, however, being swung down over the leaf spring portions 12—12 and 13 so as to compensate for the greater thickness of the spring holding clip 36. Thus, the entire scale can be folded into the extremely compact dimensions illustrated in Figure 3.

In the manufacture of these scales slight variations in the thickness of the metal stock and slight variations in the spring temper of the stock are practically unavoidable. These variations may introduce large discrepancies in the scales which may not ordinarily be disregarded if close accuracy is desired. I prefer to calibrate the scales to obtain this close accuracy, such being accomplished by merely using different dies or charts for punching the scale markings 37. For example, each leaf stamping 10 is first calibrated by testing its flexure in response to a standard weight or weights, and it is determined from this calibration test whether the pendant member 25 to be associated with that spring stamping should have its scale divisions 37 located closer together or spread further apart on the reader portion 27, there being several groups of these pendant members to pick from, each group having their scale divisions distributed over different spacings. Thus, the pendant members in group A might have their scale divisions distributed over a distance of 1 inch; those in group B over a distance of 1¼ inches; these in group C over a distance of 1½ inches; and those in group D over a distance of 1¾ inches. The preliminary testing of each leaf spring shows whether the pendant member to be associated with that leaf spring should be taken from group A, B, C or D.

While I have illustrated and described what I regard to be the preferred embodiment of my invention, nevertheless it will be understood that such is merely exemplary and that numerous modifications and rearrangements may be made therein without departing from the essence of the invention.

I claim:

1. In a postal scale of the class described, the combination of a supporting bail adapted to be held in the hand substantially vertically and comprising two downwardly extending laterally spaced bail arms having transversely aligned pivot apertures in their lower ends, an elongated substantially rectangular sheet metal plate having transversely aligned pivot lugs projecting outwardly from its longitudinal edges at a point approximately midway of the length of said plate, said pivot lugs engaging in the pivot apertures of said bail arms, a leaf spring punched out in that portion of said plate which lies to one side of the pivot axis of said pivot lugs and apertures, the other portion of said plate lying to the other side of said transverse pivot axis substantially counter-balancing the other punched out portion of said plate, said leaf spring having a flexing end lying substantially between said bail arms, and a pendant member pivotally connected to the flexing end of said leaf spring and comprising an upper indicating portion adapted to occupy a position between said bail arms when the scale is in use and comprising a lower portion to which the object to be weighed is attached.

2. In a scale of the class described, the combination of a supporting bail comprising two downwardly extending laterally spaced bail arms having transversely aligned supporting pivots adjacent their lower ends, an elongated sheet metal plate having transversely aligned cooperating pivots at its longitudinal edges located at a point approximately midway of the length of said plate, said cooperating pivots carried by said plate having cooperative engagement with the supporting pivots carried by said bail arms, one end portion of said plate lying to one side of the pivot axis of said cooperating pivots having slots punched therein which define a multiple section leaf spring comprising outer and inner leaf spring sections flexing in series, the other end portion of said plate lying to the other side of the transverse pivot axis substantially counterbalancing the punched out portion of said plate, a pendant member pivotally connected to the flexing portion of the inner spring section, scale divisions marked on said pendant member adapted to cooperate with pointer means associated with said bail, and means for hanging the article to be weighed from said pendant member, said supporting bail and said pendant member being foldable into positions substantially parallel with said sheet metal plate.

3. In a weighing scale, the combination of a supporting bail adapted to be held substantially vertically and comprising two downwardly extending laterally spaced bail arms, a sheet metal plate disposed between said bail arms, pivot means pivotally supporting said plate substantially intermediate its ends between said bail arms on a transverse pivot axis, one of the end portions of said plate to one side of said pivot axis having slots therein defining a double cantilever leaf spring comprising inner and outer leaf spring sections flexing in series, the other portion of said plate to the other side of said transverse pivot axis substantially counterbalancing the slotted portion of said plate, a pendant member pivotally connected to the flexing portion of said inner spring section, and means for hanging the article to be weighed from said pendant member.

4. A scale according to claim 2 wherein said pendant member has an offset intermediate portion enabling said pendant member to be folded into a position substantially parallel with said plate.

5. A scale according to claim 3 wherein the pendant extends down through an opening in said inner spring section, and is provided with a spur for preventing accidental upward displacement of the pendant through said opening.

6. A scale according to claim 3 wherein a spring clip is connected with the lower end of the pendant, and said plate is provided with an opening for receiving a portion of said spring clip.

References Cited in the file of this patent

UNITED STATES PATENTS

| Number | Name | Date |
|---|---|---|
| 66,524 | Shaler | July 9, 1867 |
| 69,774 | Cox | Oct. 15, 1867 |
| 338,894 | Watt | Mar. 30, 1886 |
| 371,920 | Both | Oct. 25, 1887 |
| 1,885,356 | Karrer | Nov. 1, 1932 |
| 2,016,420 | Engst | Oct. 8, 1935 |
| 2,335,771 | Konvalinka | Nov. 30, 1943 |
| 2,649,294 | Walter | Aug. 18, 1953 |

FOREIGN PATENTS

| Number | Country | Date |
|---|---|---|
| 227,451 | Germany | Oct. 22, 1910 |
| 598,580 | Germany | June 13, 1934 |